United States Patent [19]

Lancette

[11] Patent Number: 4,873,780
[45] Date of Patent: Oct. 17, 1989

[54] DEVICE FOR RETAINING A FISH LINE AGAINST A TAPERED FISHING ROD

[76] Inventor: Henry J. Lancette, 2050 Delaware, Apt. 437, St. Paul, Minn. 55118

[21] Appl. No.: 150,983
[22] Filed: Feb. 1, 1988
[51] Int. Cl.⁴ .......................................... A01K 87/00
[52] U.S. Cl. .................................................. 43/25.2
[58] Field of Search .................. 43/25.2, 25, 18.1, 23; 248/229

[56] References Cited

U.S. PATENT DOCUMENTS

| | | | |
|---|---|---|---|
| 309,028 | 12/1884 | Byington | 43/25.2 |
| 2,385,209 | 9/1945 | Joyce | 248/229 |
| 3,036,398 | 5/1962 | Gagner | 43/25.2 |
| 3,425,150 | 2/1969 | Braese | 43/25.2 |
| 3,483,996 | 12/1969 | Scammon | 24/336 |
| 3,521,332 | 7/1970 | Kramer | 248/229 |
| 3,545,119 | 12/1970 | Murnan | 43/25 |
| 3,581,428 | 6/1971 | Helder | 43/25 |
| 4,707,892 | 11/1987 | Nelson | 43/25.2 |

Primary Examiner—Gene P. Crosby

[57] ABSTRACT

The one-piece device includes a shank having oppositely projecting pairs of laterally spaced jaws forming a keyhole slot therebetween. The lateral spacing of one pair of jaws is greater than that of the other pair. Both pairs of jaws have curved inner surfaces with outwardly diverging end portions and angularly disposed flats on their outer surfaces. The shank is provided with a pair of V-shaped grooves having converging curved sides for wedgedly receiving a segment of the fish line therein, one groove being between the jaws of one pair and the other groove being between the jaws of the other pair. The device is preferably fabricated from nylon.

4 Claims, 1 Drawing Sheet

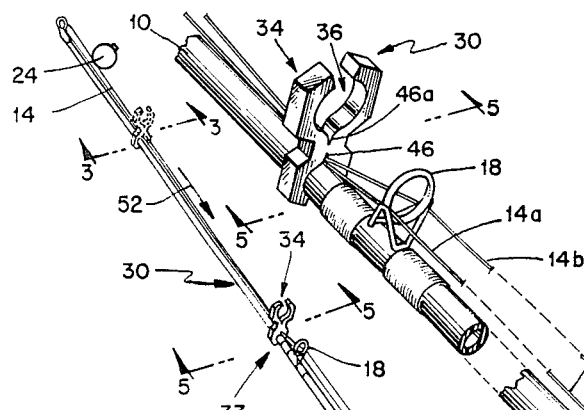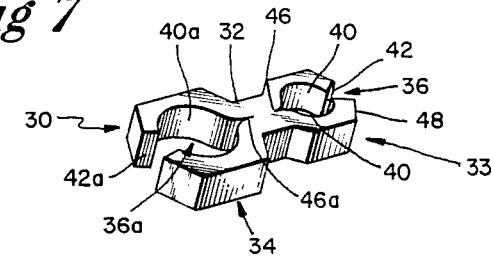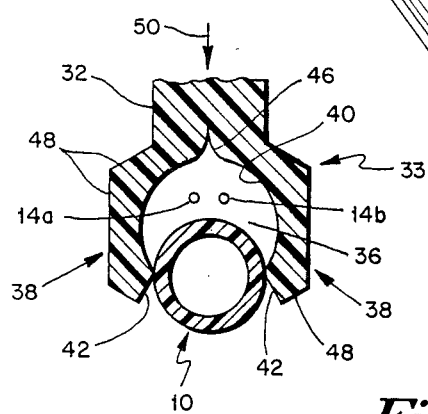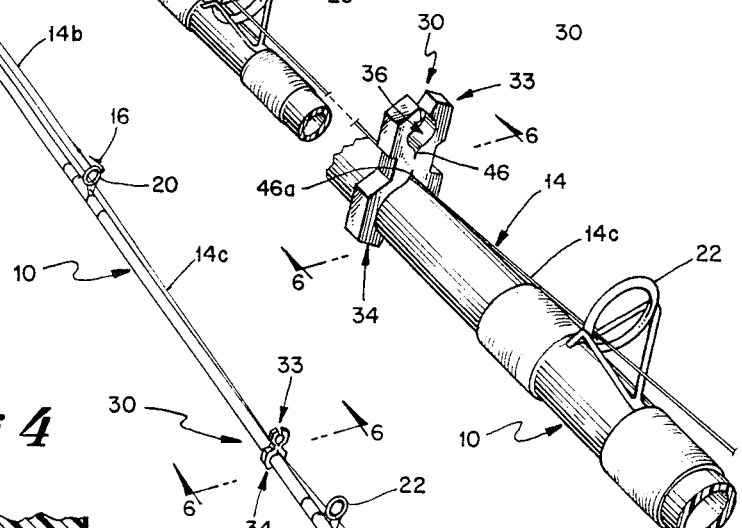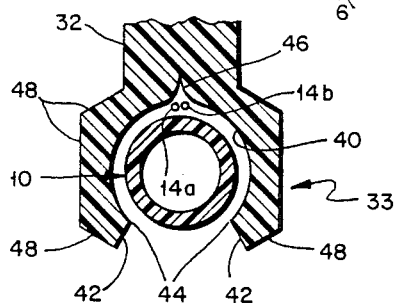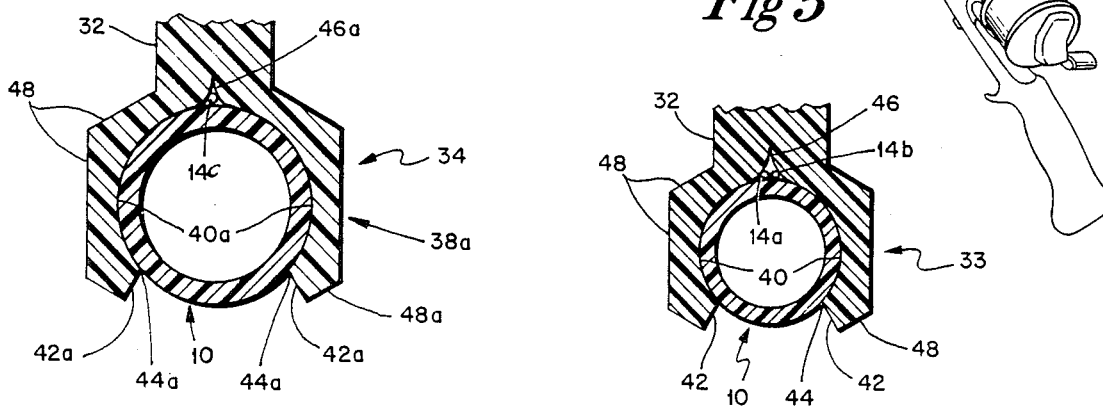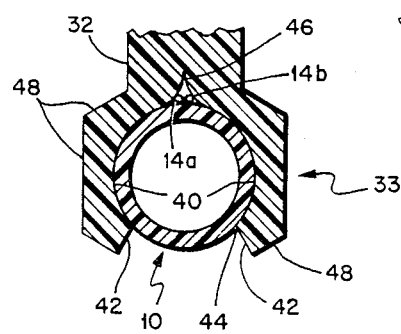

DEVICE FOR RETAINING A FISH LINE AGAINST A TAPERED FISHING ROD

BACKGROUND OF THE INVENTION

1. Field of the Invention

This invention relates generally to fishing rods, and pertains more particularly to a device for retaining at least a portion of a fish line in a proximal relationship with a portion of a tapered fishing rod.

2. Description of the Prior Art

Preventing fish lines from becoming entangled, not only with other fish lines but also with other objects, has been a problem for fishermen throughout the years. For example, fishing rods are commonly placed in the trunks of automobiles and their lines become entangled with other objects in the trunk and also with hooks and lures on the fish lines of other rods. Similar difficulties are encountered on boats where fishermen lay their rods and reels on the bottoms of their boats while motoring to a casting spot or with extra rods that may not be in use while trolling. Likewise, fishermen face similar problems when storing their tackle between trips and between seasons.

Usually, fishermen simply put up with the entanglement. On the other hand, attempts have been made to prevent a line from becoming entangled with another line or other objects by twisting wires around portions of the rod and line, or by tying short lengths of cord around the two at selected locations. Obviously, such attempts require both the twisting and untwisting of the wires and the tying and untying of the cords, both being nuisances to say the least.

Hence, a very real need continues to exist for a satisfactory device that will overcome the above difficulties.

SUMMARY OF THE INVENTION

Accordingly, an important object of the present invention is to provide a device that can be easily applied to and removed from tapered fishing rods having fish lines thereon with tackle attached to the lines, the device effectively preventing entanglement of the lines with each other and other objects.

Another object of the invention is to provide a device of the foregoing character that can be quickly applied to one longitudinal portion of a typical fishing rod and then slid to another portion thereof. More specifically, it is planned that the device be applied to a smaller cross section of the rod where the cross section is approximately equal to the entrance between the two jaws of the device, and the device manually advanced along the rod until the jaws tightly grip the larger cross section portion.

Another object of the invention is to provide a device having a head at each end thereof each with spaced jaws which have different spacings between their jaws so that one end of the device can be applied to a relatively small cross section of the rod and the head of the other end of a duplicate device to a larger cross section. Thus, it is planned that two identical devices be employed at two longitudinally spaced locations on one rod although more devices, whether identical or of different size, may be used to effect the desired degree of line retention.

Another object is to provide a double-headed device for retaining portions of a fish line against a fishing rod in which the head not being applied to the rod may be grasped between a person's fingers when applying the other end to the rod. In other words, the invention contemplates the use of one end of the device as a handle and the other end as the retaining end, and vice versa.

A further object is to provide a plurality of double-headed devices of graduated size so that a fisherman possessing a set of such devices will always have a device of appropriate size for the various rods that he may own.

Yet another object is to provide a device that can be manufactured and sold at a relatively low price, thereby encouraging its widespread use and the purchase of several such devices of varying size.

Another object of the invention is to provide a device that will be rugged and long-lasting, actually having virtually a permanent life so that the device can be used over and over for long periods.

Briefly, my one-piece device is fabricated from a suitable plastic, such as nylon, having a pair of C-shaped jaws at each end with a shank therebetween. The C-shaped jaws in each instance form a slot having a keyhole shape; more specifically, the slot has a generally cylindrical portion that subtends an arc of approximately 300 degrees, the end portions of the jaws diverging at approximately 60 degrees. In this way, one end of the device can be grasped between the fisherman's fingers and the device applied to an appropriate section of the fishing rod, a portion where the diameter of the rod approximates the entrance to the keyhole slot. In this way, the device can be advanced at right angles toward the rod until the circular or curved portion of the keyhole embraces or encircles the rod at that location. The device can then be manually slid longitudinally along the tapered fishing rod until the clearance is completely taken up. This occurs when the device reaches a second location where the diameter or cross section of the rod equals for all intents and purposes the diameter of the circular portion of the keyhole slot. A V-shaped groove or notch having curved sides is provided in the device so that segments of the fish line can be wedged therein. The user selects the appropriate head on the two-headed device having the keyhole slot therein that more closely approximates the rod size. It is intended that number of devices be provided having keyhole slots of graduated sizes so that the fisherman will always have one or more devices of the proper size.

BRIEF DESCRIPTION OF THE DRAWINGS

FIG. 1 is a perspective view of a conventional rod and reel having two of my devices applied thereto;

FIG. 2 is a fragmentary perspective view corresponding to FIG. 1, the view being greatly enlarged with a central section thereof removed so as to show the two devices to better advantage;

FIG. 3 is an enlarged fragmentary sectional view taken generally in the direction of line 3—3 of FIG. 1 showing one of my devices as it is being applied;

FIG. 4 is a fragmentary sectional view taken at the same location as FIG. 3 but after it has been applied and depicting the clearance that exists between the rod and the encircling jaws prior to the device being longitudinally moved from the dotted line position of FIG. 1 to the solid line position of this figure which solid line position of the device also appears on an enlarged scale in the upper portion of FIG. 2;

FIG. 5 is a fragmentary sectional view taken in the direction of lines 5—5 of FIGS. 1 and 2 for the purpose of showing the lack of any clearance between my device and the rod after sufficient longitudinal movement thereof;

FIG. 6 is an enlarged fragmentary sectional view taken in the direction of lines 6—6 of FIGS. 1 and 2, the view resembling that of FIG. 5 but with the device reversed so that a larger cross section of the tapered rod is engaged; and FIG. 7 is a perspective view of my device prior to being applied to a fishing rod.

DESCRIPTION OF THE PREFERRED EMBODIMENT

Referring first to FIG. 1 and to some degree to FIG. 2, it will be observed that a fishing rod has been denoted generally by the reference numeral 10. In FIG. 1, a conventional reel 12 has been depicted and a fish line 14 extends from the reel 12, having a hook 16 at its free end. The line 14 passes through several eyes 18, 20 and 22 that constrain and guide the line 14 during casting and retrieval. For the sake of completeness a float 24 has also been illustrated.

A one-piece device exemplifying my invention has been denoted generally by the reference numeral 30. The device 30 comprises a shank 32, a relatively small head 33 and a relatively large head 34. The head 33 is formed with a keyhole-like slot 36.

Describing the shape of the relatively small head 33, it will be perceived that this head 33 includes a pair of laterally spaced C-shaped jaws 38 (best seen in FIGS. 3 and 4) having opposed partially circular or curved surfaces 40 that subtend an arc on the order of 300 degrees. The jaws 38 have diverging end portions 42 that flare outwardly at approximately 60 degrees from the curved surfaces 40 thereby forming a juncture line at 44. The curved surfaces 40 and the diverging end portions 42 form the above-referred to keyhole slot 36.

Additionally, the head 33 has a V-shaped or sawtooth notch or groove 46 formed therein, the notch or groove 46 having inwardly converging curved sides for the wedged (when desired) accommodation or reception of a segment of the fish line 14. Owing to the location where FIGS. 3 and 4 are taken, two segments or portions of the line 14 appear in these two views and have been indicated by the reference numerals 14a and 14b. Although FIG. 5 represents a different location along the fishing rod 10 from that appearing in FIGS. 3 and 4, it will be appreciated that the line segments 14a and 14b are also present in FIG. 5. However, only a segment 14c of the line 14 appears in FIG. 6.

For both aesthetic and practical reasons, each jaw 38 is formed with several flats 48. These flats 48, in addition to imparting a pleasing appearance to the head 33, also facilitate a grasping thereof when the larger head 34 is to be applied to the fishing rod 10 and vice versa.

The entrance provided by the junction lines 44 is simply the narrowest spacing between the jaws 38 and leads into the region formed by the opposed curved surfaces 40. It will be appreciated that the space between the junction lines 44 need not correspond precisely to the cross section or diameter of the rod 10 at the location where the device 30 is applied to the rod, for the application of my device 30 can be accomplished wherever there is a space difference between the junction lines 44 and the cross section of the fishing rod 10. Even if the cross section of the rod 10 is slightly (but only slightly) greater than the spacing between the junction lines 44 of the jaws 38, the jaws 38 can be flexed somewhat by virtue of the inherent resiliency of the device's material and the divergence of the end portions 42 which can provide a slight camming action for the jaws 38. In this regard, it is planned that the device 30 be fabricated from a suitable plastic, preferably nylon. This particular plastic material is excellently suited for the intended purpose, not only because of a limited degree of inherent resiliency but also owing to its low coefficient of friction which enables the device 30 to be smoothly slid along the rod 10.

From FIG. 3 it will be seen that the device 30, when being applied to the rod 10, is manually advanced at right angles toward a comparatively small cross section of the rod 10, the arrow 50 indicating this directional movement. The fisherman, although not pictured, grasps the larger head 34, which serves as a handle, when moving the device 30 in the direction of the arrow 50. Further advancement in the direction of the arrow 50 establishes the relationship portrayed in FIG. 4.

Once the head 33 of the device 30 has been applied to the fishing rod 10 at the phantom location thereof in FIG. 1 which relationship appears in FIG. 4, the device 30, while its larger head 34 continues to be grasped by the fisherman, can be manually moved along the rod 10 to the upper solid line position of the device 30 shown in FIGS. 1 and 2. In other words, the device 30 is shifted or advanced in the direction of the arrow 52. Inasmuch as the rod 10 has a tapered cross section, the clearance appearing in FIG. 4 is eliminated when the device 30 reaches the solid line location of the device 30, as can be readily appreciated from FIG. 5.

It will be noted that the two segments 14a and 14b of the fish line 14 are received in the notch or groove 46 and remain therein as the device 30 is advanced from the phantom location to the solid line location. Stated somewhat differently, the segments 14a and 14b are automatically guided into the notch or groove 46 and are completely held captive therein when the solid line location is reached which location is best illustrated in FIG. 5. At this point the fisherman may tighten the line 14 by means of the reel 12, causing one segment 14a or 14b of the line 14 to become wedged (not illustrated) in the V-shaped groove 46, or the fisherman may manually flex, say, the segment 14b into the groove 46 to the extent that it becomes wedged (not illustrated) therein. It is preferable that the fishook 16 be initially engaged with an appropriate eye, and with this in mind the hook 16 is shown engaged with the eye 20, although either of the eyes 18 or 22 could be selected. My device 30 assures that the hook 16 will remain engaged with the selected eye.

While any number of my devices 30 can be employed in conjunction with a given fishing rod 10 and fish line 14, it has been found in practice that just two devices 30 will suffice. This accounts for the somewhat larger head 34 at the other end of the shank 32. Other than differing in size, the construction of the head 34 is the same as that of the head 33. Therefore, the corresponding parts constituting the head 34 are simply distinguished from the parts constituting the head 33 by virtue of the suffix "a."

It will be understood that the larger head 34 is made use of where the cross section of the rod 10 is greater. Therefore, in FIG. 1, the head 34 is being employed to retain the line segment 14a captive, as can be best understood from FIG. 6, and if desired wedged (not shown) upwardly into the apex of the V-shaped groove 46a.

Having presented the foregoing description, the benefits to be gained from employing one or more of my devices 30 should be apparent. All that a fisherman need do is select which of the heads 33 or 34 most closely corresponds to the cross section of the rod 10 where the device is to be applied. Having selected the appropriate longitudinal location on the rod 10, the device 30, depending on which head 33 or 34 is being used, is simply advanced or applied in the direction of the arrow 50 (FIG. 3) so that the appropriate cross section of the rod 10 is received in the key hole slot 36 (FIG. 4) or 36a, as the case may be.

The device 30 is then manually slid along the rod 10 in the direction of the arrow 52 (FIG. 1) so as to take up whatever clearance exists, the clearance being taken up when the device 30 reaches the location in which it appears in FIG. 5. FIG. 5 shows the use of the smaller head 33 and FIG. 6 shows the use of the larger head 34. When the smaller head 33 is being applied, the larger head 34 is employed as a handle, and when the larger head 34 is being applied the smaller head 33 is employed as a handle. Consequently, two longitudinally spaced segments or portions of the fish line 14 are held captive in the illustrated situation so as to retain the line 14 in a proximal relationship with the rod 10, thereby avoiding entanglement with other lines or objects. Of course, more than two devices 30 can be used on a single rod 10, although two will normally be adequate.

What might not be apparent is that the fisherman has another choice as to how the line 14 is retained. One choice has been illustrated and described. The not-so-obvious second choice is that the devices 30 may be applied as pictured in FIG. 2 without the line segments 14a, 14b and 14c being contained in the keyhole slots 36, 36a. Then either the segment 14a or 14b can be manually pressed into the V-shaped groove 46 and the segment 14c into the groove 46a. Stated somewhat differently the upper unused notches 46a and 46 can be used to wedgedly contain the line segments therein. When so employed the fisherman need only dislodge the wedged in line segments (not shown) from the grooves 46a and 46. When my devices 30 are used this way, they do not have to be removed from the rod 10, and can, if desired, be rotated through 180 degrees into even a less interfering position than that depicted in FIGS. 1 and 2 after the line 14 has been removed. Thus, the V-shaped grooves or notches 46 and 46a with their inwardly converging curved sides enhance the versatility of my invention.

It is not believed necessary to show additional devices 30 having different size keyhole slots 36 therein. The keyhole slots 36 will merely be progressively larger so as to accommodate larger cross section rods. The fabrication cost of my device 30 is sufficiently low so that sets of six ca be inexpensively marketed. More specifically, a pair of devices 30 in a set of six would have identical keyhole slots 36 and 36a, whereas each of the remaining pairs would have progressively larger keyhole slots. Stated somewhat differently, the slot sizes would be graduated from pair to pair.

I claim:

1. In combination with a tapered fishing rod having a flexible fish line extending longitudinally therealong, a plastic device retaining said fish line in a fixed relation with said fishing rod comprising a shank member and a pair of jaw members integral therewith having a lateral spacing greater than a first tapered portion of said rod and having a cross section less than a second tapered portion of said rod, said jaw members tightly engaging a third tapered portion of said rod residing between said first and second portions to retain a portion of said fish line in a fixed relation with said third rod portion, said jaw members possessing a limited degree of inherent resiliency and having a low coefficient of friction, thereby enabling said device to be smoothly slid along said tapered rod from said first portion to said third portion to cause said jaw members to tightly engage said third portion.

2. The combination of claim 1 in which said shank has a V-shaped groove with converging sides formed between said jaw members, said fish line portion being wedged in said groove.

3. A method of retaining a flexible fish line against a tapered fishing rod, the fish line extending longitudinally along one side of the fishing rod, the method comprising the steps of first advancing a device having a pair of laterally spaced C-shaped jaw members toward said tapered fishing rod in a direction generally at right angles to said one side of said fishing rod to loosely confine a segment of said fish line between said shank and said rod at a first location having a cross section less than the lateral spacing between said jaw members so that some clearance exists between said jaw members and said fishing rod, and then advancing said device along said tapered fishing rod to a second location having a larger cross section corresponding generally to the lateral spacing between said jaw members to cause said jaw members to tightly grip the larger cross section of said rod and to eliminate said clearance, whereby a second segment of said fish line is held captive at said second location.

4. The method of claim 3 in which said device includes a shank member integral with said jaw members having a V-shaped groove formed with converging sides, the method including the step of wedging said second segment of said fish line into said groove.

* * * * *